(12) United States Patent
Luo et al.

(10) Patent No.: US 10,963,265 B2
(45) Date of Patent: Mar. 30, 2021

(54) APPARATUS AND METHOD TO SWITCH CONFIGURABLE LOGIC UNITS

(71) Applicant: MICRON TECHNOLOGY, INC., Boise, ID (US)

(72) Inventors: Fa-Long Luo, San Jose, CA (US); Tamara Schmitz, Scotts Valley, CA (US); Jeremy Chritz, Seattle, WA (US); Jaime Cummins, Bainbridge Island, WA (US)

(73) Assignee: Micron Technology, Inc., Boise, ID (US)

( * ) Notice: Subject to any disclaimer, the term of this patent is extended or adjusted under 35 U.S.C. 154(b) by 206 days.

(21) Appl. No.: 15/493,551

(22) Filed: Apr. 21, 2017

(65) Prior Publication Data

US 2018/0307483 A1    Oct. 25, 2018

(51) Int. Cl.
  *G06F 9/38*    (2018.01)
  *G06F 15/78*    (2006.01)

(52) U.S. Cl.
  CPC ........ *G06F 9/3897* (2013.01); *G06F 15/7867* (2013.01); *G06F 15/7871* (2013.01)

(58) Field of Classification Search
  CPC ...... G06F 15/00; G06F 15/78; G06F 15/7871; G06F 15/7892; G06F 15/7867; G06F 15/17312; G06F 17/5077; G06F 17/5054; G06F 17/5044; G06F 9/50; G06F 9/3897
  USPC ................................................. 712/35, 36, 37
  See application file for complete search history.

(56) References Cited

U.S. PATENT DOCUMENTS

| 5,771,362 A | 6/1998 | Bartkowiak et al. |
| 6,247,036 B1* | 6/2001 | Landers .............. G06F 9/30003 708/603 |
| 6,425,068 B1* | 7/2002 | Vorbach ................ G06F 9/3897 712/18 |
| 6,996,709 B2* | 2/2006 | Arnold .................. G06F 9/3001 713/100 |

(Continued)

OTHER PUBLICATIONS

International Search Report and Written Opinion dated Jul. 20, 2018 for PCT Application No. PCT/US2018/025675, 16 pages.

(Continued)

*Primary Examiner* — William B Partridge
*Assistant Examiner* — Courtney P Carmichael-Moody
(74) *Attorney, Agent, or Firm* — Dorsey & Whitney LLP (57) ABSTRACT

Examples described herein include systems and methods which include an apparatus comprising a plurality of configurable logic units and a plurality of switches, with each switch being coupled to at least one configurable logic unit of the plurality of configurable logic units. The apparatus further includes an instruction register configured to provide respective switch instructions of a plurality of switch instructions to each switch based on a computation to be implemented among the plurality of configurable logic units. For example, the switch instructions may include allocating the plurality of configurable logic units to perform the computation and activating an input of the switch and an output of the switch to couple at least a first configurable logic unit and a second configurable logic unit. In various embodiments, configurable logic units can include arithmetic logic units (ALUs), bit manipulation units (BMUs), and multiplier-accumulator units (MACs).

27 Claims, 5 Drawing Sheets

(56) References Cited

U.S. PATENT DOCUMENTS

| | | | |
|---|---|---|---|
| 7,635,987 B1* | 12/2009 | Agarwal | G06F 15/7867 326/39 |
| 7,793,074 B1 | 9/2010 | Wentzlaff et al. | |
| 8,990,278 B1* | 3/2015 | Clegg | G06F 7/544 708/272 |
| 2003/0108040 A1 | 6/2003 | Baxter | |
| 2004/0001445 A1* | 1/2004 | Stansfield | H03K 19/17796 370/254 |
| 2004/0111590 A1* | 6/2004 | Klein, Jr. | G06F 9/30181 712/226 |
| 2006/0253689 A1* | 11/2006 | Knowles | G06F 9/3004 712/226 |
| 2007/0260847 A1* | 11/2007 | Kitaoka | G06F 15/7867 712/11 |
| 2008/0040722 A1* | 2/2008 | Kelem | G06F 15/7867 718/104 |
| 2008/0263323 A1* | 10/2008 | Mould | G06F 9/3836 712/42 |
| 2009/0282213 A1 | 11/2009 | Tanaka et al. | |
| 2011/0125984 A1 | 5/2011 | Bisinella | |
| 2012/0265914 A1* | 10/2012 | Master | G06F 15/7867 710/305 |

OTHER PUBLICATIONS

English translation of KR Office Action dated Jan. 19, 2021 for KR Application No. 10-2019-7034012, pp. all.

* cited by examiner

APPARATUS AND METHOD TO SWITCH CONFIGURABLE LOGIC UNITS

BACKGROUND

Many processing architectures exist to accomplish digital signal processing (DSP) capabilities, such as adders, multipliers, and other arithmetic logic units (ALUs) utilized in combination. For example, digital signal processing for wireless communications, such as digital baseband processing or digital front-end implementations, may be implemented using hardware (e.g. silicon) computing platforms. Multimedia processing and digital radio frequency (RF) processing may be implemented using an application-specific integrated circuit (ASIC). Accordingly, a variety of hardware platforms are available to implement digital signal processing, such as the ASIC, a digital signal processor (DSP) implemented as part of a field-programmable gate array (FPGA), or a system-on-chip (SoC). However, each of these solutions often requires implementing customized signal processing methods that are hardware-implementation specific. Such architectures, custom-built, may not be able to (or not efficiently able to) implement other applications that were not designed specifically for that hardware architecture.

DETAILED DESCRIPTION

Certain details are set forth below to provide a sufficient understanding of embodiments of the present disclosure. However, it will be clear to one skilled in the art that embodiments of the present disclosure may be practiced without various of these particular details. In some instances, well-known wireless communication components, circuits, control signals, timing protocols, computing system components, and software operations have not been shown in detail in order to avoid unnecessarily obscuring the described embodiments of the present disclosure.

Example systems and methods described herein include integrated circuits, such as an FPGA, that provide switch instructions to various switches based on a computation to be implemented among a plurality of configurable logic units coupled to inputs and outputs of the switches. Providing switch instructions in such a way may allow an efficient allocation of configurable logic units in an integrated circuit, and can improve processing time of computations that may involve iterative or repetitive computation. For example, such switch instructions may improve the processing time of wireless communications processing, DSP operations, machine learning, tensor processing, matrix operations, or artificial intelligence operations; for example, for such operations and/or processing to be performed more efficiently through an efficient allocation of configurable logic units for respective processing tasks. For example, if the computation to be implemented is a Fast Fourier Transform (FFT), a routing path through a portion of the plurality of configurable logic units may be selected to achieve an arrangement of, for example an arithmetic logic unit (ALU) and a multiplier-accumulator unit (MAC), which may compute an inverse square root operation associated with the FFT or QR decomposition. QR decompositions may be used, for example, to decompose a matrix A into a product of an orthogonal matrix Q and an upper triangular matrix R. QR decomposition may be used, for example, in solving least squares problems. In some current implementations of an FPGA architecture, a DSP unit process such an inverse square root operation may be implemented in a specific circuit specially configured for such a computation. For example, a programmer may configure specific circuitry in a specific portion of the FPGA to configure the FPGA to perform such a computation when called by an operation, like an FFT operation. However, such configurations (which may be by pre-design) do not allow the flexibility of an FPGA framework to dynamically reallocate the couplings of configurable logic units or determine routing paths, when called, for example, by an operation in-process at the FPGA. Accordingly, it may be advantageous to provide an integrated circuit (e.g., a programmable logic device (PLD)) that can activate the input and outputs of respective switches within that integrated circuit, to form routing paths for a computation to be implemented among the plurality of configurable logic units. For example, the computation may be dynamically called during a process or circuit implemented at the integrated circuit.

Additionally, some operations may include iterative processing of a computation (e.g. repeated use of an operation). For example, an inverse square root operation of an FFT or QR decomposition process may include iterative processing, such that the iterative processing increases the precision of the solution to the inverse square root computation. Iterative processing in such a square root operation may also facilitate an efficient solution to the inverse square operation. Accordingly, it may be advantageous to provide an integrated circuit (e.g., a programmable logic device (PLD)) that can activate the input and outputs of respective switches within that integrated circuit, such that an iterative computation may be performed utilizing the coupled configurable logic units of those activated inputs and outputs. Such an integrated circuit, as described herein, may also include switch instructions that specify a number of iterations for the computation to be performed iteratively; for example, when an input for that operation is received at a switch. The iterative processing may be facilitated by a direct coupling between the initial switch receiving the input, and a final switch that provides feedback (e.g., an intermediate processing result) to the initial switch.

Figure 1:
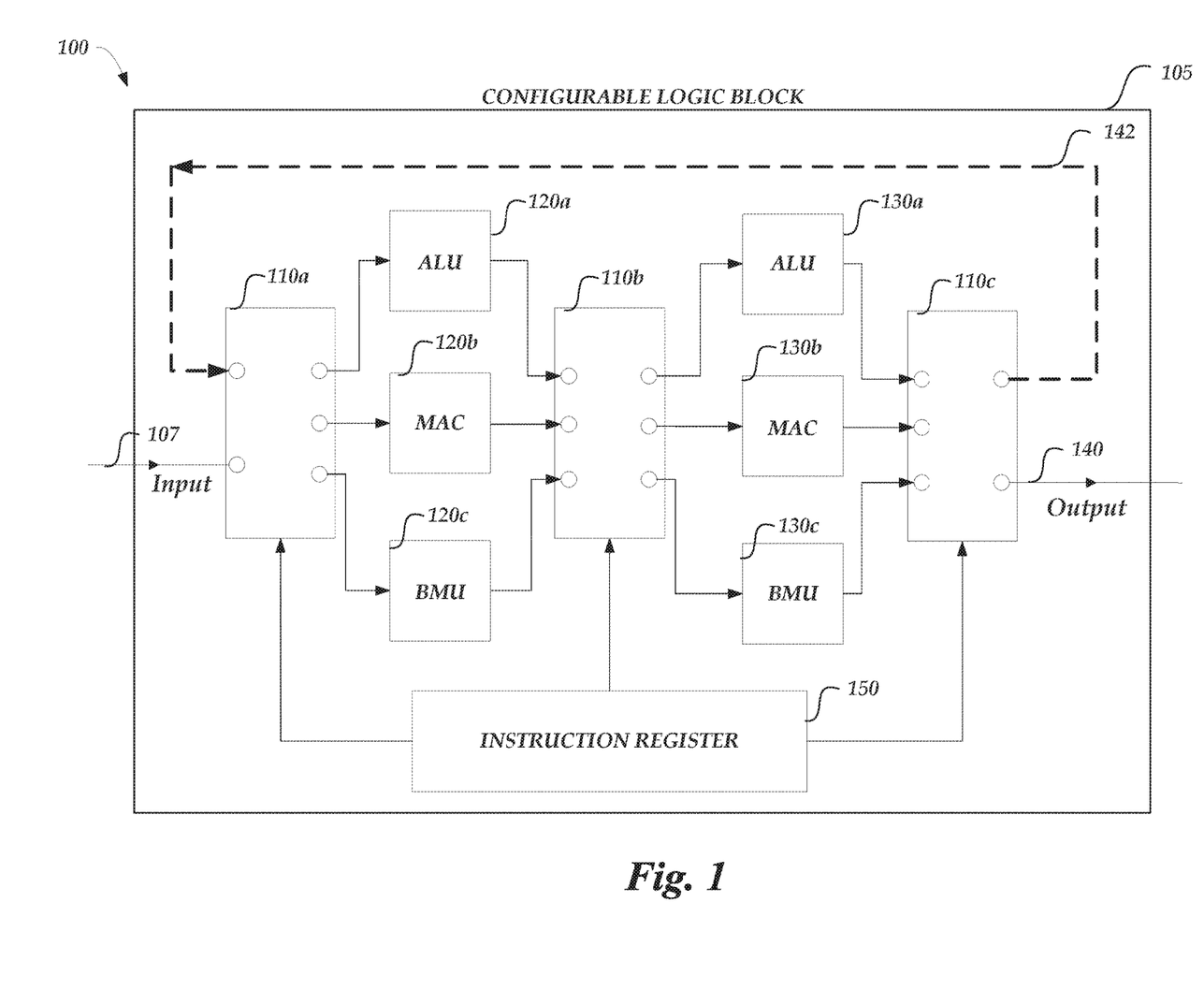
FIGS. 1-2 are block diagrams of an example integrated circuit in accordance with embodiments of the present disclosure.

FIG. 1 is a block diagram of an example integrated circuit 100 in accordance with embodiments of the present disclosure. The example integrated circuit 100 includes at least one configurable logic block 105. The configurable logic block 105 may include an arrangement of circuit elements or a single circuit that performs operations, as a part of the integrated circuit 100. In some embodiments, the configurable logic block 105 may implement various functionalities for the integrated circuit, such as computation processing for various operations of wireless communications processing, DSP operations, machine learning applications, tensor processing, matrix operations, or artificial intelligence operations. The configurable logic block 105 may be configured to implement a specific computation or sub-computation of an operation executing on the integrated circuit 100. As depicted in FIG. 1, the configurable logic block 105 may include an input port for an input path 107 coupled to the configurable logic block 105 via an input of the switch 110a. The configurable logic block 105 may include an output port for an output path 140 coupled to the configurable logic block 105 via an output of the switch 140. The integrated circuit 100 may provide input paths 107 to the configurable logic block 105 for processing of an operation executing on the integrated circuit 100. Output paths 140 may be provided from the configurable logic block 105, which may provide data upon completion of the processing by configurable logic block 105. The input path 107 may receive one or more operands for processing in the configurable logic block 105. The output path 140 may provide one more operands for further processing via a feedback line 142 of the configurable logic block 105 or for an input to the operation executing on the integrated circuit 100. Such input paths 107 and output paths 140 may facilitate processing of operations executing in the integrated circuit 100; for example by utilizing the efficient allocation of logic units 120a-120c, 130a-130c in the configurable logic block 105.

The configurable logic block 105 includes switches 110a-110c and logic units 120a-120c, 130a-130c. As depicted, inputs and outputs of the switches 110a-110c are coupled to various respective outputs and inputs of the logic units 120a-120c, 130a-130c. For example, a first output of switch 110a is coupled to an input of the ALU 120a; a second output of the switch 110a is coupled to the input of the MAC 120b; and a third output of the switch 110a is coupled to the input of the bit manipulation unit (BMU) 120c. Continuing in the example, an output of the ALU 120a is coupled to a first input of the switch 110b; and output of the MAC 120b is coupled to a second input of the switch 110b; and an output of the BMU 130c is coupled to a third input of the switch 110b. As another example, the first output of switch 110b is coupled to an input of the ALU 130a; a second output of the switch 110b is coupled to the input of the MAC 130b; and a third output of the switch 110b is coupled to the input of the BMU 130c. Continuing in this example, an output of the ALU 130a is coupled to a first input of the switch 110c; and output of the MAC 130b is coupled to a second input of the switch 110c; and an output of the BMU 130c is coupled to a third input of the switch 110c.

Generally described, the ALU 120a, 130b, the MAC 120b, 130b, and BMU 120c, 130c may be an implementation of a configurable logic unit (CLU). A configurable logic unit may perform a variety of arithmetic, matrix, tensor, and/or DSP operations. A CLU may be an arrangement of circuit elements or a single circuit that performs such an operation. A CLU may be used to implement an adder unit (e.g., the ALUs 120a, 130b), a multiplier unit, an accumulator unit, a multiply-accumulate unit (e.g., the MACs 120b, 130b), a carry-in unit, a carry-out unit, a bit shifter, a logic unit configured with NAND gates, and/or generally any type of arithmetic logic unit or DSP logic unit that may process DSP operations. One or more CLUs may work combination to receive and process operands via input and output ports of those respective CLUs.

The ALUs 120a, 130b may be a specific implementation of a configurable logic unit. The ALUs 120a, 130b may receive one or more operands from the respective switches 110a, 110b for an addition operation. For example, the ALU 120a may receive an operand from the switch 110a to add with another operand. The other operand may also be received from the switch 110a; or, in some implementations, the other operand may be retrieved from a register of the ALU 120a or a look-up table of the configurable logic block 105. The ALU 120a outputs the addition processing result to the switch 110b.

The MACs 120b, 130b may be a specific implementation of a configurable logic unit. The MACs 120b, 130b may receive one or more operands from the respective switches 110a, 110b for an addition operation. For example, the MAC 120b may receive an operand from the switch 110a to multiply and accumulate with other operands. In the example, the MAC 120b may perform a multiply-accumulate operation such that two operands, A and B, are multiplied and then added with C to generate a new version of C that is the output of the MAC 120b. The other operands may also be received from the switch 110a; or, in some implementations, the other operand may be retrieved from a register of the MAC 120b or a look-up table of the configurable logic block 105. The MAC 120b outputs the multiply-accumulation processing result to the switch 110b.

The BMUs 120c, 130c may be a specific implementation of a configurable logic unit. The BMUs 120c, 130c may receive one or more operands from the respective switches 110a, 110b for a bit manipulation operation. Bit manipulation operations may include manipulations on one or more bits of the operand. Such bit manipulations may include setting a bit, clearing a bit, toggling a bit, testing a bit, shifting a bit, or performing a bitwise operation on a bit. Bitwise operations may include AND, OR, XOR, or NOT logical operations on a bit. For example, the BMU 120a may receive an operand from the switch 110a to alter a bit of that operand. In the example, the BMU 120a may perform setting one or more bits of the operand, such that the operand is set to a zero vector (e.g., setting all bits to zero) or a unity vector (e.g., setting all bits to one). The BMU 120a outputs the bit manipulation processing result to the switch 110b.

The configurable logic block 105 also includes the instruction register 150 that is configured to provide respective switch instructions to each switch 110a-110c based on a computation to be implemented among at least some of the ALUs 120a, 130a, MACs 120b, 130b, and the BMUs 120c, 130c. The instruction register 150 may receive such instructions (or instructions representative of the switch instructions) to perform the computation from the integrated circuit 100. The instruction register 150 may receive such instructions, for example, from an interconnect coupled to the configurable logic block 105 (such as the interconnect 302 coupling configurable logic blocks 305a-305f in FIG. 3). The instruction register 150 in some examples may receive a computation mode selection from an operation execution on the integrated circuit 100 or a user interacting with the integrated circuit 100. A computation mode selection may indicate a specific computation mode for the configurable logic block 105. The switch instructions may utilize a computation mode selection to allocate respective the ALUs 120a, 130a, MACs 120b, 130b, and the BMUs 120c, 130c of the configurable logic block 105 for processing of data from an input data path 107 to generate data provided to an output data path 140 or feedback 142. The computation mode may be implemented using the instruction register 150 that may store a mode indicator based on the computation to be implemented among the ALUs 120a, 130a, MACs 120b, 130b, and the BMUs 120c, 130c. The computation mode of the configurable logic block 105 can be utilized by the instruction register 150 to determine a routing path among the ALUs 120a, 130a, MACs 120b, 130b, and the BMUs 120c, 130c for the computation to be implemented. The instruction register 150 may identify an availability status of each of the ALUs 120a, 130a, MACs 120b, 130b, and the BMUs 120*c*, 130*c*. For example, the ALU 130*a* may not be available if it is performing a computation for another process executing on the configurable logic block 105. The ALU 120*a* may be available if it is not performing a computation or is not scheduled to execute a computation on the configurable logic block 105.

The instruction register 150 may allocate certain tasks among the ALUs 120*a*, 130*a*, MACs 120*b*, 130*b*, and the BMUs 120*c*, 130*c* for the computation to be implemented. In some examples, execution of the switch instructions may include allocation of the ALUs 120*a*, 130*a*, MACs 120*b*, 130*b*, and the BMUs 120*c*, 130*c* to operate according to the computation mode. Execution of the switch instructions may include providing selection signals to the switches 110*a*-110*c* to specify which inputs and outputs are activated of the respective switches for that specific computation. For example, if the computation to be implemented is an inverse square root operation, which may be associated with an FFT operation or QR decomposition, a routing path through the ALUs 120*a*, 130*a*, MACs 120*b*, 130*b*, and the BMUs 120*c*, 130*c* may be determined to perform the inverse square root operation. Accordingly, the switch instructions may provide selection signals that may activate respective inputs and outputs for the configurable logic block 105 to implement this computation. In the example of the inverse square root operation, such switch instructions may include a selection signal that indicates the first output of switch 110*a* that is coupled to an input of the ALU 120*a* is to be activated; and another selection signal that indicates the output of the ALU 120*a* that is coupled to a first input of the switch 110*b* is to be activated. For example, such selection signals may be provided to the switches 110*a*, 110*b* from the instruction register 150. The switch instructions may further include a selection signal that may indicate the second output of the switch 110*b* is to be coupled to the input of the MAC 130*b* is to be activated; and another selection signal that indicates the output of the MAC 130*b* that is coupled to a second input of the switch 110*c* is to be activated. For example, such selection signals may be provided to the respective switches 110*b*, 110*c* from the instruction register 150.

As another example of allocation among the ALUs 120*a*, 130*a*, MACs 120*b*, 130*b*, and the BMUs 120*c*, 130*c* by the instruction register 150, if the computation to be implemented is a Galois-Field division, a routing path through the ALUSs 120*a*, 130*a*, MACs 120*b*, 130*b*, and the BMUs 120*c*, 130*c* may be provided which implements all or a portion of Galois-Field division. For example, the switch instructions may provide selection signals that activate respective inputs and outputs for the configurable logic block 105 to implement Galois-Field division. Such switch instructions may include a selection signal that indicates the first output of switch 110*a* that is coupled to an input of the ALU 120*a* is to be activated; and another selection signal that indicates the output of the ALU 120*a* that is coupled to a first input of the switch 110*b* is to be activated. For example, such selection signals may be provided to the switches 110*a*, 110*b* from the instruction register 150. The switch instructions may further include a selection signal that indicates the third output of the switch 110*b* that is coupled to the input of the BMU 130*c* is to be activated; and another selection signal that indicates the output of the BMU 130 that is coupled to a third input of the switch 110*c* is activated. For example, such selection signals may be provided to the respective switches 100*b*, 110*c* from the instruction register 150.

In providing the switch instructions, the instruction register 150 may also include an indication of a number of iterations to be performed through the portion of the ALUs 120*a*, 130*a*, MACs 120*b*, 130*b*, and the BMUs 120*c*, 130*c* allocated to perform the computation. In various embodiments, the number of iterations may be specified in the computation mode selection received at the instruction register 150. The number of iterations may be based on that computation to be implemented among the ALUs 120*a*, 130*a*, MACs 120*b*, 130*b*, and the BMUs 120*c*, 130*c*. In iterating, the configurable logic block 105 may utilize the feedback line 142 to provide an intermediate processing result from a final configurable logic unit of a determined routing path back to an initial configurable logic unit of that same determined routing path for that computation mode.

In some examples, execution of the switch instructions may include providing a selection signal including the number of iterations to operate according to the specified iterations for that computation. Execution of the switch instructions may include providing selection signals to the switches 110*a*-110*c* to specify how many executions of operands are to be scheduled for the allocated portion of the ALUs 120*a*, 130*a*, MACs 120*b*, 130*b*, and the BMUs 120*c*, 130*c*. For example, if the computation to be implemented is an inverse square root operation, switch instructions may include a selection signal that indicates the number of iterations an operand is to be provided to the first output of switch 110*a* that is coupled to an input of the ALU 120*a*; and another selection signal that indicates the number of iterations an operand is to be received from the output of the ALU 120*a* that is coupled to a first input of the switch 110*b*. For example, such selection signals may be provided to the switches 110*a*, 110*b* from the instruction register 150. The switch instructions may further include a selection signal that indicate the same number of iterations an operand is to be provided to the second output of the switch 110*b* that is coupled to the input of the MAC 130*b*; and another selection signal that indicates the same number of iterations an operand is to be received from the output of the MAC 130*b* that is coupled to a second input of the switch 110*c*. For example, such selection signals may be provided to the respective switches 110*b*, 110*c* from the instruction register 150. In some examples, the number of iterations through such a routing may be 3, 10, 128, 256, or 512 iterations. In iterating, the configurable logic block 105 may utilize the feedback line 142 to provide an intermediate processing result from the MAC 130*b* via the switch 110*c* back to the ALU 120*a* via the feedback line. The number of iterations may specify the number of iterations that the feedback line is utilized.

As another example of providing a number of iterations in the switch instructions, if the computation to be implemented is a Galois-Field operation, such as multiplication, switch instructions may include a selection signal that indicates the number of iterations an operand is to be provided to the first output of switch 110*a* that is coupled to an input of the ALU 120*a*; and another selection signal that indicates the number of iterations an operand is to be received from the output of the ALU 120*a* that is coupled to a first input of the switch 110*b*. For example, such selection signals may be provided to the switches 110*a*, 110*b* from the instruction register 150. The switch instructions may further include a selection signal that indicate the same number of iterations an operand is to be provided to the third output of the switch 110*b* that is coupled to the input of the BMU 130*c*; and another selection signal that indicates the same number of iterations an operand is to be received from the output of the BMU 130 that is coupled to the third input of the switch 110*c*. For example, such selection signals may be provided to the respective switches 110*b*, 110*c* from the instruction register 150. In some examples, the number of iterations through such a routing may be 2, 10, 128, 256, or 512 iterations. In iterating, the configurable logic block 105 may utilize the feedback line 142 to provide an intermediate processing result from the BMU 130c via the switch 110c back to the ALU 120a via the feedback line.

Advantageously, the integrated circuit 100 of FIG. 1 may activate the inputs and outputs of respective switches within that integrated circuit, to form routing paths for a computation to be implemented among the ALUs 120a, 130a, MACs 120b, 130b, and the BMUs 120c, 130c. Accordingly, the computation may be dynamically called during a process or circuit implemented at the integrated circuit 100, with the switch instructions providing selection signals to the switches 110a-110c to implement the computation in the configurable logic block 105. While described in the context of an integrated circuit, it can be appreciated that the configurable logic block 105 may be included in any hardware platform, such as an ASIC, an FPGA, or a SoC.

Figure 2:
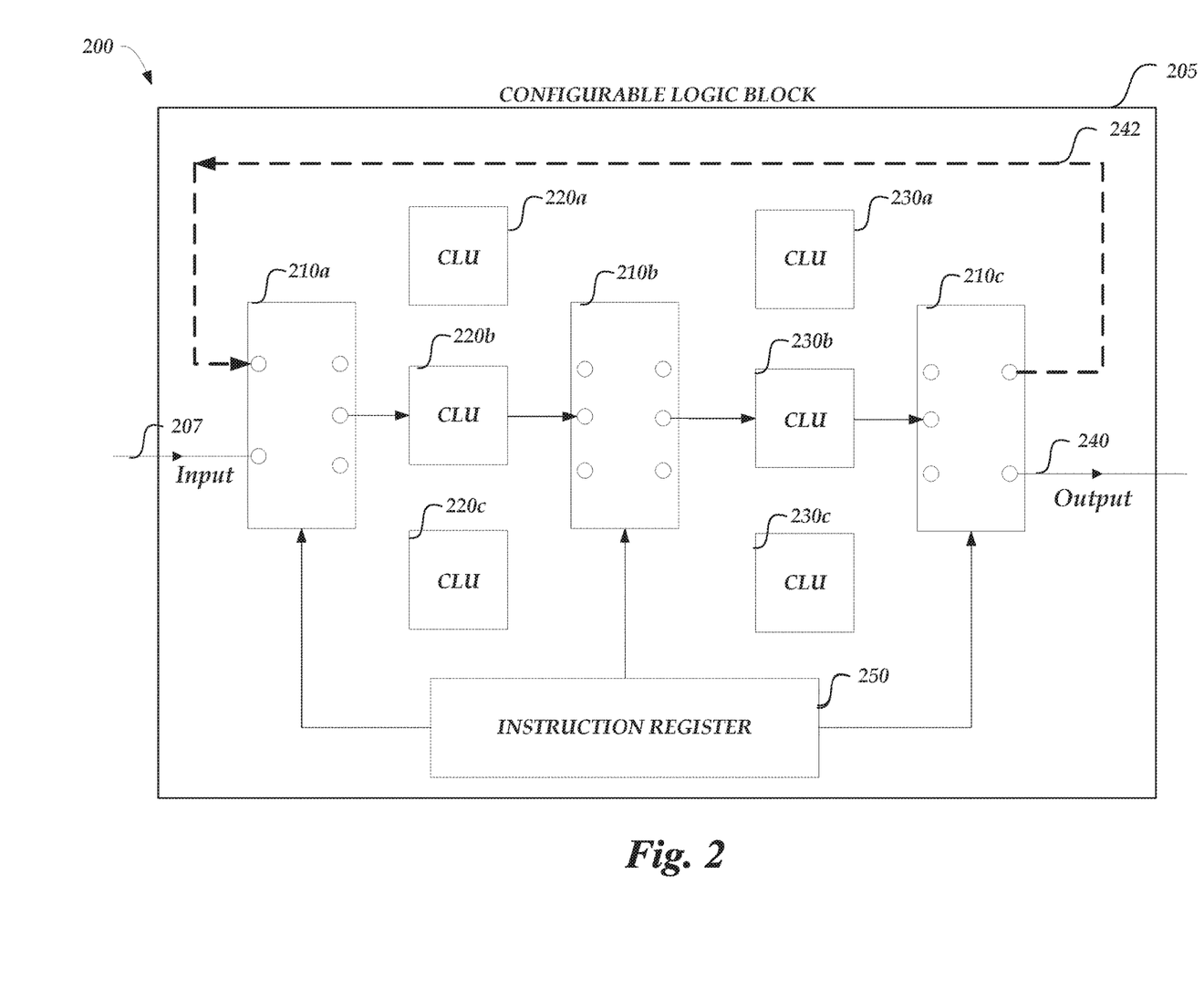

FIG. 2 is a block diagram of an example integrated circuit 200 in accordance with embodiments of the present disclosure. The example integrated circuit 200 includes at least one configurable logic block 205. Similarly numbered elements of FIG. 2 include analogous functionality to those numbered elements of FIG. 1. For example, the instruction register 250 may operate and be configured like the instruction register 150 of FIG. 1. The configurable logic block 205 includes the CLUs 220a-c, 230a-c. As described herein, a configurable logic unit, such as CLUs 220a-c, 230a-c, may perform a variety of arithmetic, matrix, tensor, or DSP operations. Any of the CLUs 220a-c, 230a-c, may be used to implement an adder unit (e.g., like the ALUs 120a, 130b), a multiplier unit, an accumulator unit, a multiply-accumulate unit (e.g., like the MACs 120b, 130b), a carry-in unit, a carry-out unit, a bit shifter, a bit manipulation unit (e.g., like the BMUs 120c, 130c), a logic unit configured with NAND gates, and/or generally any type of arithmetic logic unit or DSP logic unit that may process DSP operations.

The instruction register 250 may provide respective switch instructions to each switch 210a-210c according to a computation to be implemented among at least some of the CLUs 220a-c, 230a-c. The instruction register 250 may receive such instructions (or instructions representative of the switch instructions) to perform the computation from the integrated circuit 200. The instruction register 250 may receive such instructions, for example, from an interconnect coupled to the configurable logic block 205 (such as the interconnect 302 coupling configurable logic blocks 305a-305f in FIG. 3). The instruction register 250 some examples, may receive a computation mode selection, for example, a computation mode selection from an operation execution on the integrated circuit 200 or a user interacting with the integrated circuit 200. A computation mode selection can indicate specific computation mode for the configurable logic block 205. The switch instructions may utilize a computation mode selection to allocate respective the CLUs 220a-c, 230a-c of the configurable logic block 205 for processing of an input data path 207 to generate an output data path 240 or feedback 242. The computation mode may be implemented using the instruction register 250 that stores a mode indicator based on the computation to be implemented among the CLUs 220a-c, 230a-c. The computation mode of the configurable logic block 205 can be utilized by the instruction register 250 to determine a routing path among the CLUs 220a-c, 230a-c for the computation to be implemented.

Execution of the switch instructions may include providing selection signals to the switches 210a-210c to specify which inputs and outputs are activated of the respective switches for that specific computation. For example, a computation may include at least an addition operation and a multiplication operation. The addition operation and multiplication operation may be referred to as sub-computations of the computation. A routing path through the CLUs 220a-c, 230a-c may be determined to be an allocation of the CLU 220b and the CLU 230b to perform the respective addition and multiplication operations. Accordingly, the switch instructions may provide selection signals that activate respective inputs and outputs for the configurable logic block 205 to implement this computation. In the example of computation including the addition and multiplication operation, such switch instructions may include a selection signal that indicates a second output of switch 210a that is coupled to an input of the CLU 220b is to be activated; and another selection signal that indicates the output of the CLU 220b that is coupled to a second input of the switch 210b is to be activated. For example, such selection signals may be provided to the switches 210a, 210b from the instruction register 250. The switch instructions may further include a selection signal that indicate the second output of the switch 210b that is coupled to the input of the CLU 220c is to be activated; and another selection signal that indicates the output of the CLU 220c that is coupled to a second input of the switch 110c is to be activated. For example, such selection signals may be provided to the respective switches 110b, 110c from the instruction register 150. In various embodiments, input and outputs may be utilized of the switches 210a-210c from whichever inputs and outputs are not currently activated. A selection signal may also indicate that another output or input of a switch is to be utilized rather than a path that has been activated. Accordingly, in the example of the depicted path of the output of the CLU 220c that is coupled to a second input of the switch 110c, a selection signal may, instead, indicate that the output of the CLU 220c is be coupled to a third input of the switch 110c.

The instruction register 250 may provide respective switch instructions to each switch 210a-210c that configure at least some of the CLUs 220a-c, 230a-c to perform a specific sub-computation of the computation to be implemented among the CLUs 220a-c, 230a-c. For example, a first CLU 220a may receive instructions from the switch to be configured as an adder unit that adds an operand to be received from the switch 210a to another operand. The other operands may also be received from the switch 110a; or, in some implementations, the other operand may be retrieved from a register of the CLU 220a or a look-up table of the configurable logic block 205. The second CLU 220b may receive instructions from the switch to be configured as a multiplier unit that multiplies the result of an addition operation from the first CLU 220a, received via the activated second input and second output of the switch 210b, with the another operand.

In providing the switch instructions, the instruction register 250 may also include an indication of a number of iterations to be performed through the portion of the CLUs 220a-c, 230a-c allocated to perform the computation. In various embodiments, the number of iterations may be specified in the computation mode selection received at the instruction register 250. The number of iterations may be based on that computation to be implemented among the CLUs 220a-c, 230a-c. In iterating, the configurable logic block 205 may utilize the feedback line 242 to provide an intermediate processing result from a final configurable logic unit of a determined routing path back to an initial configurable logic unit of that same determined routing path for that computation mode.

While described in the context of examples of a computation including an addition and multiplication sub-computations, it can be appreciated that the CLUs 220a-c, 230a-c may perform a variety of computations, with sub-computations to be implemented among the CLUs 220a-c, 230a-c to perform the computation. Such computations may include an inverse square root operation, a Galois-Field division, a Galois-Field multiplication, or any other computations performed in integrated circuits for the execution of wireless communications processing, DSP operations, machine learning, tensor processing, matrix operations, or artificial intelligence operations. Such operations and/or processing may be performed more efficiently through an efficient allocation of CLUs 220a-c, 230a-c for a processing task. While FIG. 2 depicts two columns of CLUs 220a-c, 230a-c and three switches 110a-110c, it can be appreciated that any number of columns of CLUs 220a-c, 230a—and any number of switches 110a-110c may be included in the configurable logic block 205; for example, as physical space on the integrated circuit 200 allows.

Figure 3:
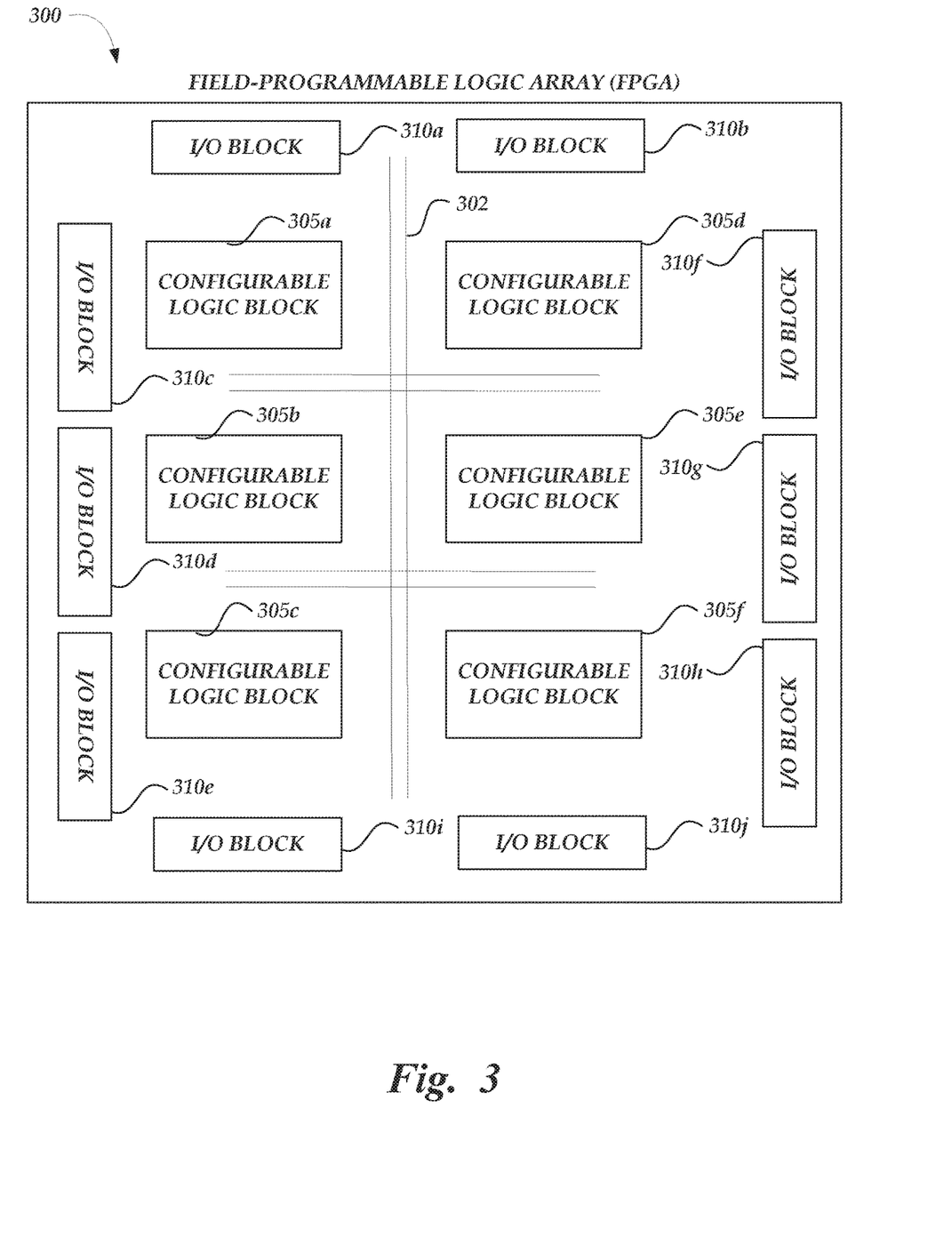
FIG. 3 is a block diagram of an example FPGA in accordance with an embodiment of the present disclosure.

FIG. 3 is a block diagram of an example FPGA 300 in accordance with an embodiment of the present disclosure. Example FPGA 300 is an example of an integrated circuit having configurable logic blocks, such as configurable logic blocks 105 or configurable logic blocks 205. The FPGA 300 includes an interconnect 302, with configurable logic blocks 305a-305f and I/O blocks 310a-310j coupled thereto. While only eight configurable logic blocks 305a-305f and ten I/O blocks 310a-310j are depicted in FIG. 3, it can be appreciated that FPGA 300 may include any number of configurable logic blocks and I/O blocks 310a-310j. The FPGA 300 may cascade configurable logic blocks 305a-305f together such that a configurable logic block 305a-305f may provide at least one output path as at least one input path to another configurable logic block. A configurable logic block 305a-305f may be implemented using be a programmable logic block, such as a computer readable medium storing instructions, or a logic circuit comprising one or more logic units, such as one or more NAND gates. The configurable logic blocks 305a-305f may be cascaded across logical rows and columns with I/O blocks 310a-310j bounding respective rows and columns for connections external to the FPGA 300. The configurable logic blocks 305a-305f may implement configurable logic block that performs various computations, such as the configurable logic block 105 or 205. Certain configurable logic blocks 305a-305f configured to operate as the configurable logic blocks 105 or 205 may be logically analogous or similar circuits that are cascaded in the FPGA 300 to perform a single or multiple computations. The computations performed by the configurable logic block 105 or 205 may change individually or in combination. In one implementation, the FPGA 300 may include a number of configurable logic blocks 305a-305f, implemented as the configurable logic block 105 or 205, to perform an inverse square root operation.

Figure 4:
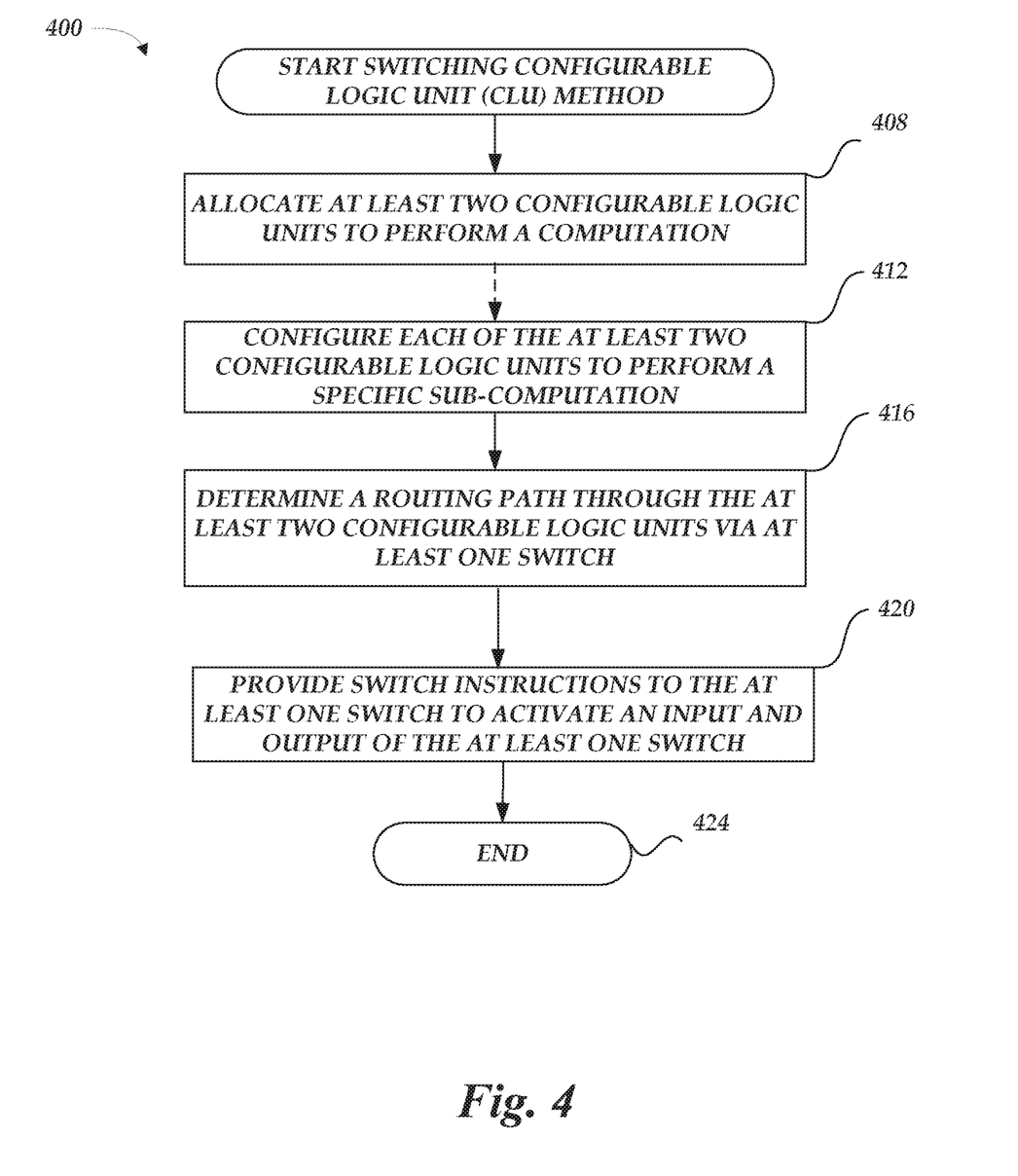
FIG. 4 is a flow diagram of an example method of switching configurable logic units (CLUs) according to an embodiment of the disclosure.

FIG. 4 is a flowchart of a method 400 in accordance with examples described herein. Example method 400 may be implemented using, for example, the integrated circuit 100 in FIG. 1, or any system or combination of the systems depicted in FIGS. 1-3 and/or described herein. The operations described in blocks 408-424 may be stored as control instructions in a computer-readable medium of or coupled to an integrated circuit (e.g., the integrated circuit 100) or a memory accessible by the integrated circuit.

Example method 400 may begin the switching CLU method. The method 400 may include a block 408 that recites "allocate at least two configurable logic units to perform a computation." An instruction register may receive a computation mode selection that indicates a specific computation mode for a configurable logic block. The switch instructions may utilize the computation mode selection to allocate respective CLUs of the configurable logic block for processing of input data to generate output data and/or feedback. The instruction register may identify an availability status of each of the CLUs. For example, a CLU may not be available if it is performing a computation for another process executing on the configurable logic block. The CLU may be available if it is not performing a computation or is not scheduled to execute a computation on the configurable logic block. Block 408 may be followed by block 412 that recites "configure each of the at least two configurable logic units to perform a specific sub-computation." As depicted with a dotted line from block 408 to block 412, block 412 may be an optional step. An instruction register may be configured to provide respective switch instructions to some switches of a configurable logic block that configure at least some of the CLUs to perform a specific sub-computation of the computation to be implemented among the CLUs. For example, a first CLU may receive instructions from the switch to be configured as a CLU with a specific functionality available to that CLU, and a second CLU may receive instructions from another switch to be configured as a CLU with a specific functionality available to that CLU or as a CLU that facilitates the functionality of the first CLU.

Block 412 may be followed by block 416 that recites "determine a routing path through the at least two configurable logic units via at least one switch." Once availability statuses have been identified, the instruction register may determine a routing path among the CLUs for the computation to be implemented. For example, a computation mode selection can indicate a number of functionalities to be performed by the CLUs and a number of CLUs to perform the computation based on those functionalities. The computation mode selection may also indicate a number of iterations to be performed to compute a final processing result for the computation. The instruction register may utilize such information to determine a routing path among the CLUs based at least on the computation or an availability status of CLUs in a configurable logic block. Block 416 may be followed by block 420 that recites "provide switch instructions to the at least one switch to activate an input and output of the at least one switch." The instruction register may provide switch instructions that include selection signals that activate respective inputs and outputs of switches to implement the computation. The instruction register may provide switch instructions that include an indication of a number of iterations to be performed through the portion of the CLUs allocated to perform the computation. A selection signal of the switch instructions may also indicate that another output or input of a switch is to be utilized rather than a coupling that has been activated. Block 420 may be followed by block 424 that may end the method 400.

The blocks included in the described example methods 400 are for illustration purposes. In some embodiments, the blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Figure 5:
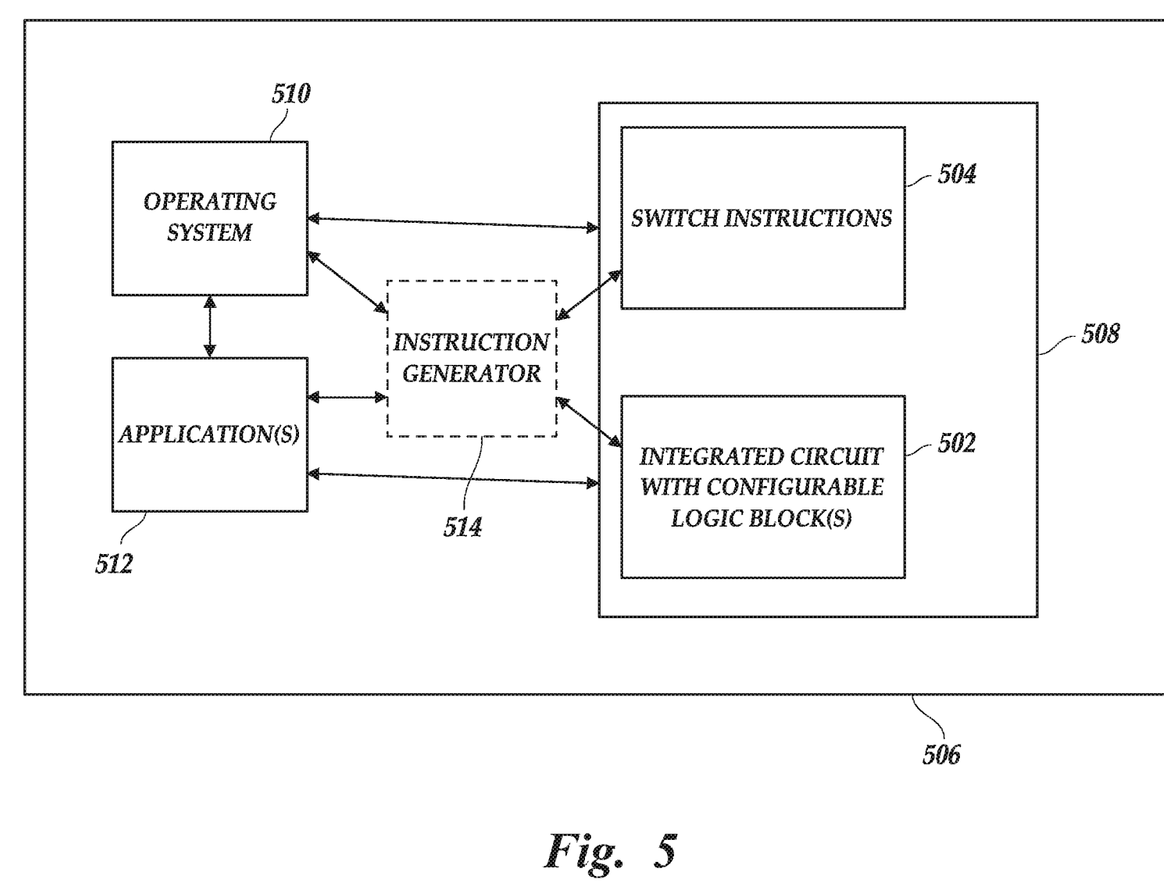
FIG. 5 is a schematic illustration of system arranged in accordance with examples described herein.

FIG. 5 is a schematic illustration of system arranged in accordance with examples described herein. The system 506 includes processing unit(s) 508, which may include integrated circuit with configurable logic block(s) 502 and switch instructions 504. The system 506 may also include operating system 510, application(s) 512, and/or instruction generator 514 which may include executable instructions stored on one or more electronic storage devices accessible to the system 506 and which may be executed by the processing unit(s) 508.

The processing unit(s) 508 including the switch instructions 504 and integrated circuit with configurable logic block(s) 502 may be implemented using examples of integrated circuits described herein, such as with reference to FIGS. 1-4. The processing unit(s) 508 may be implemented, for example, using one or more FPGAs, DSPs, ASICs, and/or SOCs. Other circuitry may be included in processing unit(s) 508 other than the switch instructions 504 and integrated circuit with configurable logic block(s) 502 in some examples. Application(s) 512 may be provided to implement any of a variety of functionalities, such as but not limited to, wireless, video/codec, and/or machine learning applications. An instruction generator 514 may be provided in some examples which may generate switch instructions 504 in cooperation with the application(s) 512 and/or operating system 510. For example, based on operations which may be desirable in executing the application(s) 512, the instruction generator 514 may generate switch instructions 504 that may cause the integrated circuit with configurable logic block(s) 502 to perform certain functionality (e.g. inverse square root operation). If a different application is performed, the instruction generator 514 may generate different switch instructions 504 which may cause the integrated circuit with configurable logic block(s) 502 to perform a different functionality. In this manner, same hardware may be used to perform different functionality as described herein in accordance with switch instructions.

While instruction generator 514 is shown in FIG. 5, it may not be present in other examples. In some examples switch instructions 504 may be pre-coded and or a library of switch instructions may be stored for different scenarios. However, in some examples instruction generator 514, may be provided to generate switch instructions 504 based on the application(s) 512 to be executed by the system 506. The instruction generator 514 may be implemented, for example, as a portion of a compiler or other executable instructions (e.g. software).

From the foregoing it will be appreciated that, although specific embodiments of the present disclosure have been described herein for purposes of illustration, various modifications may be made without deviating from the spirit and scope of the present disclosure.

What is claimed is:

1. An apparatus comprising:
   a plurality of configurable logic units;
   a plurality of switches, each switch coupled to at least one configurable logic unit of the plurality of configurable logic units, wherein the plurality of switches comprises a first switch, a second switch, and a third switch, wherein the first switch is coupled to a first input receiving an initial data, and wherein the third switch is coupled to an output, and wherein the second switch comprises an input that is coupled to an output of one of the plurality of configurable logic units, and wherein an output of the third switch is coupled to an input of the first switch; and
   an instruction register configured to provide respective switch instructions of a plurality of switch instructions to each switch, including the first switch, the second switch, and the third switch, based partly on a computation mode selection, the computation mode selection indicative of a computation to be implemented among the plurality of configurable logic units, wherein the computation mode selection indicates a number of iterations to be performed through the plurality of configurable logic units for each switch.

2. The apparatus of claim 1, further comprising:
   an interconnect coupled to the instruction register,
   wherein the instruction register is configured to receive, from the interconnect, the respective switch instructions to activate respective inputs and respective outputs of the plurality of switches,
   wherein, such that when the respective inputs and outputs of the plurality of switches are activated, the plurality of switches are configured to implement the computation among the plurality of configurable logic units.

3. The apparatus of claim 2, wherein the respective switch instructions to activate respective inputs and respective outputs of the plurality of switches comprise:
   allocating a portion of the plurality of configurable logic units to perform the computation based on an availability status of each of the portion of the plurality of configurable logic units;
   determining a routing path through the portion of the plurality of configurable logic units via a portion of the plurality of the switches; and
   reallocating the portion of the plurality of configurable logic unit and re-determining the routing path during an operation in-process.

4. The apparatus of claim 3, wherein allocating the portion of the plurality of configurable logic units to perform the computation comprises:
   configuring at least one of the portion of configurable logic units to perform a specific sub-computation of the computation to be implemented among the plurality of configurable logic units.

5. The apparatus of claim 3, wherein determining the routing path through the portion of the plurality of configurable logic units via the portion of the plurality of the switches comprises:
   identifying, among the portion of the plurality of configurable logic units, the routing path based on the computation to be implemented among the plurality of configurable logic units.

6. The apparatus of claim 5, wherein the routing path includes an output of a final configurable logic unit of the portion of the plurality of configurable logic units coupled to an input of an initial configurable logic unit of the portion of the plurality of configurable logic units such that the final configurable logic unit provides an intermediate processing result to the initial configurable logic unit.

7. The apparatus of claim 3, wherein the respective switch instructions comprise instructions for each respective switch of the plurality of switches to activate the routing path via a configurable logic unit coupled to an input of the respective switch and another configurable logic unit coupled to an output of the respective switch.

8. The apparatus of claim 3, wherein the respective switch instructions of a plurality of switch instructions to each switch each comprise an indication of the number of iterations to be performed through the portion of the plurality of configurable logic units based on the computation to be implemented among the plurality of configurable logic units.

9. The apparatus of claim 3, wherein the computation to be implemented among the plurality of configurable logic units comprises an inverse square root operation, and wherein the routing path through the portion of the plurality of configurable logic units provides a path via a first configurable logic unit implemented as an arithmetic logic unit (ALU) and a second configurable logic unit implemented as a multiplier-accumulator unit (MAC).

10. An integrated circuit comprising:
a plurality of configurable logic units including a first configurable logic unit and a second configurable logic unit;
a switch coupled to at least the first configurable logic unit and to the second configurable logic unit; and
an instruction register configured to provide switch instructions to the switch based on a computation to be implemented in at least the first configurable logic unit and the second configurable logic unit, the switch instructions comprising a plurality of selection signals for the switch, each selection signal indicative of coupling an input or an output of the switch to the first configurable logic unit or the second configurable logic unit,
wherein the switch instructions to be provided to the switch include instructions which, when executed by the switch, is configured to cause the switch to perform operations comprising:
allocate the plurality of configurable logic units to perform the computation based on an availability status of each of the plurality of configurable logic units;
identify a respective availability status of each of the configurable logic units coupled to the switch;
determine, based on the identified respective availability status of each of the configurable logic units, a routing path through the plurality of configurable logic units based partly on the availability status of each of the plurality of configurable logic units; and
reallocate the plurality of configurable logic units, based at least on the availability status of each of the plurality of configurable logic units, to activate another input or output of the switch to couple at least the first configurable logic unit and the second configurable logic unit.

11. The integrated circuit of claim 10, wherein the switch instructions to be provided to the switch include further instructions which, when executed by the switch, is configured to cause the switch to perform further operations comprising:
activate an input of the switch and an output of the switch to couple at least the first configurable logic unit and the second configurable logic unit.

12. The integrated circuit of claim 11, wherein the input of the switch provides an output of the first configurable logic unit, and wherein the output of the switch provides an input of the second configurable logic unit.

13. The integrated circuit of claim 11, wherein to allocate the plurality of configurable logic units comprises:
determine that the respective availability statuses of the first configurable logic unit and the second configurable logic unit indicate an availability of each to perform the computation.

14. The integrated circuit of claim 10, wherein the first configurable logic unit comprises an arithmetic logic unit (ALU), and wherein the second configurable logic unit comprises a bit manipulation unit (BMU).

15. The integrated circuit of claim 10, wherein the first configurable logic unit comprises an arithmetic logic unit (ALU), and wherein the second configurable logic unit comprises a multiplier-accumulator unit (MAC).

16. The integrated circuit of claim 10, wherein the computation to be implemented in at least the first configurable logic unit and the second configurable logic unit comprises at least one of a Galois-Field multiplication computation, a Galois-Field division computation, or an inverse square root computation.

17. The integrated circuit of claim 10, wherein the instruction register is configured to receive, from an interconnect, the switch instructions to activate respective inputs and outputs of the switch,
wherein, such that when the respective inputs and outputs of the switch is activated, the switch is configured to implement the computation among the plurality of configurable logic units.

18. The integrated circuit of claim 10, further comprising:
an additional switch coupled to at least the second configurable logic unit and a third configurable logic unit,
wherein the switch instructions comprise a plurality of switch instructions for each switch coupled to at least one of the plurality of configurable logic units, including the switch and the additional switch.

19. A method comprising:
allocating at least two configurable logic units of a plurality of configurable logic units to perform a computation to be implemented among the plurality of configurable logic units, wherein the computation to be implemented among the plurality of configurable logic units comprises at least one of a Galois-Field multiplication computation, a Galois-Field division computation, or an inverse square root computation;
determining, based partly on a computation mode selection indicative of a user selection, a routing path through the at least two configurable logic units via at least one switch of a plurality of the switches;
providing switch instructions to the at least one switch to activate an input and an output of the at least one switch;
identifying an availability status of the at least two reconfigurable logic units; and
reallocating, based partly on the availability status of the at least two configurable logic units and the determined routing path, at least one of the two configurable logic units to perform the computation to be implemented among the plurality of configurable logic units.

20. The method of claim 19, wherein determining the routing path through the at least two configurable logic units comprises identifying the routing path through the at least two configurable logic units to include an output of one of the at least two configurable logic units coupled to an input of another of the at least two configurable logic units.

21. The method of claim 19, wherein allocating the at least two configurable logic units to perform a computation:
configuring each of the at least two configurable logic units to perform a specific sub-computation of the computation to be implemented among the plurality of configurable logic units.

22. The method of claim 21, wherein the specific sub-computation comprise at least one of an addition, a multiplication-accumulation, or a bit manipulation.

23. A system comprising:
at least one processing unit, the at least one processing unit comprising:
an integrated circuit including a plurality of configurable logic units and a plurality of switches; and
memory configured to store switch instructions for configuring the integrated circuit, the switch instructions comprising a plurality of selection signals, each selection signal indicative of coupling an input or an output of a respective switch of the plurality of switches to at least one of the plurality of configurable logic units;
executable instructions for at least one application to be executed at least in part by the at least one processing unit; and
an instruction generator coupled to the at least one processing unit and configured to provide the switch instructions based on the executable instructions for at least one application, wherein the instruction generator is configured to:
provide the switch instructions based at least in part on a functionality used by the executable instructions for the at least one application, wherein the functionality comprises an inverse square root operation, and wherein the inverse square root operation is implemented by a first configurable logic unit implemented as an arithmetic logic unit (ALU) and a second configurable logic unit implemented as a multiplier-accumulator unit (MAC);
reallocate the plurality of configurable logic units based on the switch instructions implementing the inverse square root operation such that the first configurable logic unit is implemented as the ALU and the second configurable logic unit is implemented as MAC; and
determine a routing path through the first configurable logic unit implemented as the ALU and the second configurable logic unit implemented as the MAC via a portion of the plurality of the switches.

24. The system of claim 23, wherein the switch instructions specify settings for the plurality of switches.

25. The apparatus of claim 1, wherein the coupled one of the plurality of configurable logic units is an arithmetic logic unit (ALU).

26. The apparatus of claim 1, wherein the output of the second switch is coupled to a multiplier-accumulator unit (MAC).

27. The apparatus of claim 3, wherein the computation to be implemented among the plurality of configurable logic units comprises a Galois-Field division, and wherein the routing path through the portion of the plurality of configurable logic units provides a path via a first configurable logic unit implemented as an arithmetic logic unit (ALU) and a second configurable logic unit implemented as a bit manipulation unit (BMU).

* * * * *